US010105829B2

(12) United States Patent
Parwani et al.

(10) Patent No.: US 10,105,829 B2
(45) Date of Patent: Oct. 23, 2018

(54) VACUUM ADAPTER FOR A POWER TOOL

(71) Applicant: ATLAS COPCO INDUSTRIAL TECHNIQUE AB, Stockholm (SE)

(72) Inventors: Mamoon Parwani, Saltsjö-Boo (SE); Johan Mattias Erlandsson, Stockholm (SE); Jubin Ghassabei, Bromma (SE)

(73) Assignee: Atlas Copco Industrial Technique AB, Stockholm (SE)

( * ) Notice: Subject to any disclaimer, the term of this patent is extended or adjusted under 35 U.S.C. 154(b) by 228 days.

(21) Appl. No.: 15/031,975

(22) PCT Filed: Nov. 8, 2013

(86) PCT No.: PCT/SE2013/051322
§ 371 (c)(1),
(2) Date: Apr. 25, 2016

(87) PCT Pub. No.: WO2015/069166
PCT Pub. Date: May 14, 2015

(65) Prior Publication Data
US 2016/0271770 A1 Sep. 22, 2016

(51) Int. Cl.
*B25B 23/08* (2006.01)
*B23P 19/06* (2006.01)
*B25B 21/00* (2006.01)

(52) U.S. Cl.
CPC ............ *B25B 23/08* (2013.01); *B23P 19/06* (2013.01); *B25B 21/00* (2013.01)

(58) Field of Classification Search
CPC ......... B25B 21/00; B25B 23/02; B25B 23/04; B25B 23/08; B23P 19/06; B25G 3/16; B25G 3/18
See application file for complete search history.

(56) References Cited

U.S. PATENT DOCUMENTS 3,275,047 A * 9/1966 Kulman ................. B25B 23/08
81/451
3,786,845 A 1/1974 States
(Continued)

FOREIGN PATENT DOCUMENTS

EP 0239698 A2 10/1987
KR 1020110015227 A 2/2011
(Continued)

OTHER PUBLICATIONS

International Search Report (ISR) dated Jul. 17, 2014 and International Preliminary Report on Patentability (IPRP) dated Oct. 29, 2015 issued in International Application No. PCT/SE2013/051322.

*Primary Examiner* — David B Thomas
(74) *Attorney, Agent, or Firm* — Holtz, Holtz & Volek PC

(57) ABSTRACT

A vacuum adapter for a power tool, with a bit holder extending from a front end of the power tool, is arranged to house the bit holder and to suck screws into alignment with a bit arranged inside the bit holder. The vacuum adapter includes: a connection part for connecting the vacuum adapter to the front end of the power tool such that the vacuum adapter covers the bit holder; a vacuum connection for connecting the vacuum adapter to a negative pressure source; a quick coupling for rapid disconnection of at least a part of the vacuum adapter in order to access the bit holder for exchanging bits; and a cover part arranged to cover the bit holder and that is connected to the connection part via a quick coupling and that may be separately disconnected from the power tool, leaving the connection part attached to the power tool.

3 Claims, 4 Drawing Sheets

(56) References Cited

U.S. PATENT DOCUMENTS

| | | | | |
|---|---|---|---|---|
| 4,924,732 A | * | 5/1990 | Hoskins | ............... B25B 21/00 81/451 |
| 6,264,360 B1 | * | 7/2001 | Lehmusvaara | ..... B01F 15/0048 266/262 |
| 8,245,601 B1 | * | 8/2012 | Hastama | ............... B25B 23/08 81/52 |
| 2014/0251094 A1 | * | 9/2014 | Chen | ............... B25B 23/08 81/430 |

FOREIGN PATENT DOCUMENTS

| | | |
|---|---|---|
| WO | 8302246 A1 | 7/1983 |
| WO | 2009099376 A1 | 8/2009 |

\* cited by examiner

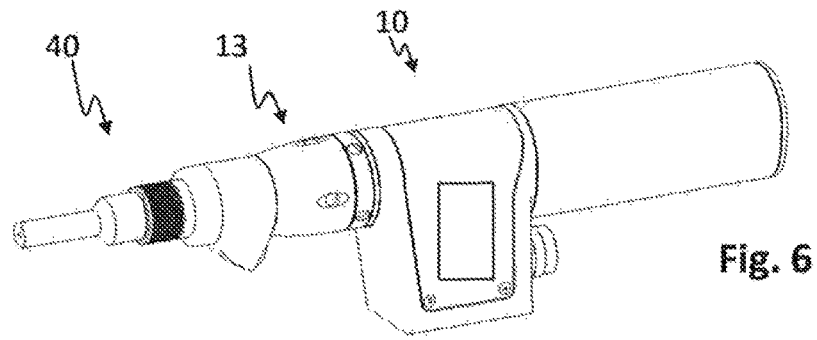
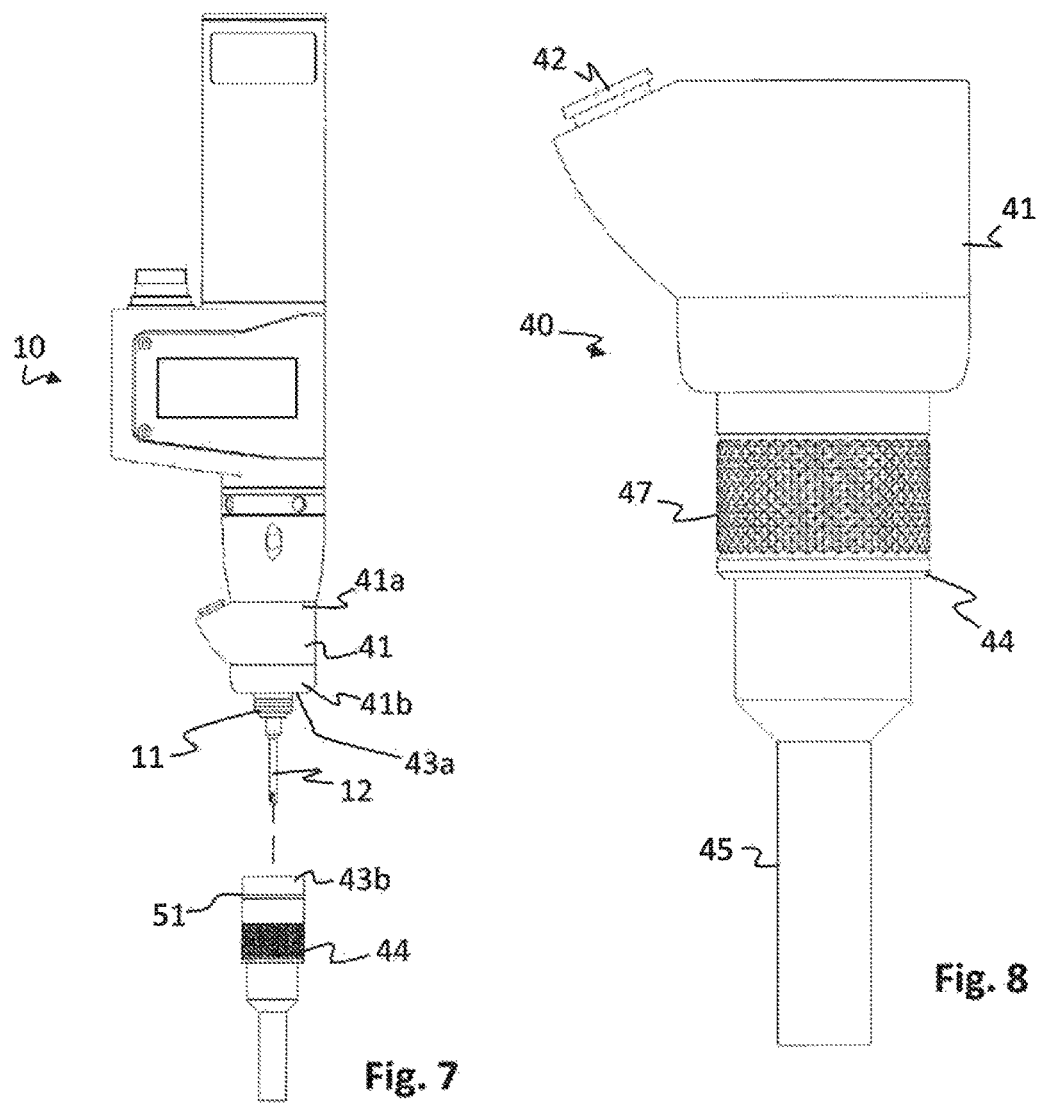

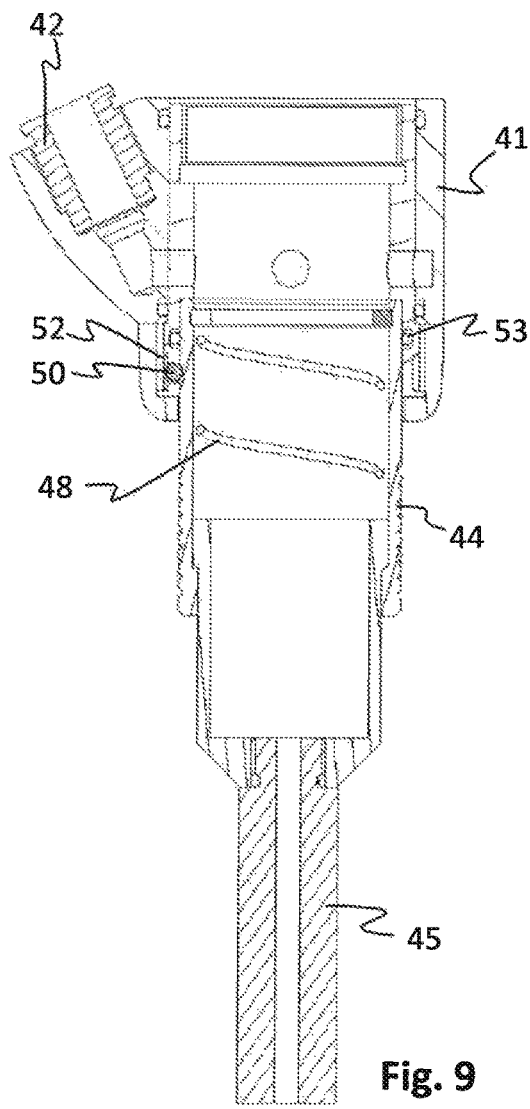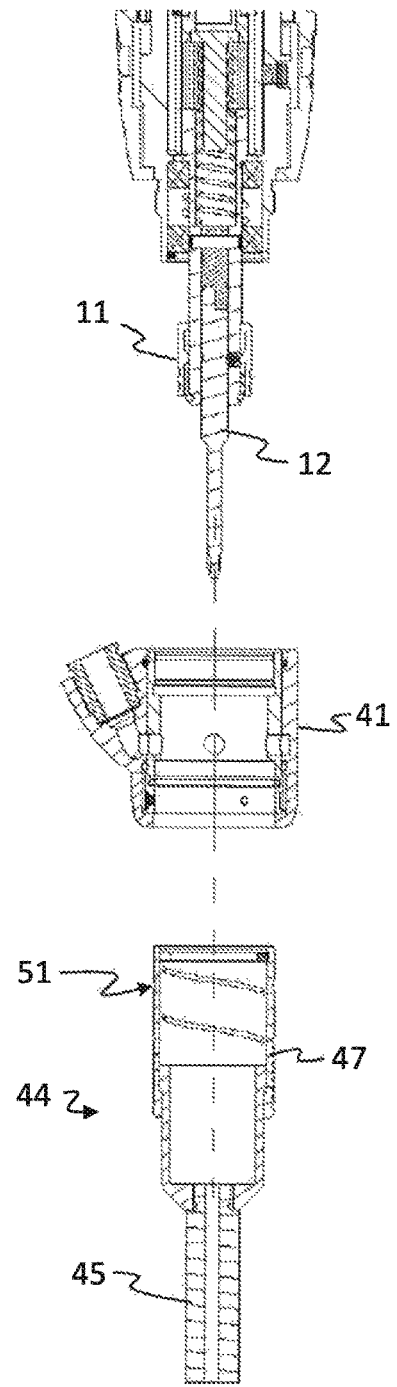
Fig. 9
Fig. 10

VACUUM ADAPTER FOR A POWER TOOL

The invention relates to a vacuum adapter for a torque delivering power tool. Specifically, the invention relates to vacuum adapter that allows easy access to a bit holder of the tool such that the tool bit of the tool may be replaced without cumbersome efforts and substantially without affecting the settings of the vacuum adapter.

BACKGROUND

In some applications in the use of power tools the handling of fastener such as screws is particularly cumbersome. This is especially true for the handling of small screws. For these applications a so called vacuum adapter may be used. The vacuum adapter is an auxiliary device that is adapted to be arranged at the front end of a power tool so as to house the tool bit that is arranged to interact with the fastener to be fastened.

The idea of the vacuum adapter is to suck up a fastener, e.g. a screw, screw head first, such that the screw head will be sucked into the vacuum adapter and into contact with the bit. Subsequently the power tool will be relocated such that the fastener will be positioned at the hole into which it is to be screwed such that the tightening operation may be initiated.

One type of such vacuum adapter is disclosed in U.S. Pat. No. 3,786,845. The vacuum adapter includes a hollow portion in which a negative pressure is produced. A front part of the vacuum adapter is telescopically arranged with respect to a main part. This telescopically arranged portion allows the screwdriver bit to be continuously repositioned between a distal and a proximal position with respect to a screw conduit into which a screw is meant to be sucked by means of the negative pressure inside the hollow portion.

There are however problems involved with this and other vacuum adapters. A first problem is that the bit may be prematurely worn out. This problem arises inter alia since an important part of the tightening operations performed by the power tool will be initiated before the bit is correctly located inside the recess of the fastener head. As the tightening operation proceeds the bit will normally find its way into the recessed fastener head.

However, an incorrectly located fastener will in most occasions lead to wear of both the recess of fastener head and the bit in the initial phase of the operation before the bit has found its way into the recess of the fastener head. Further, as the bit will be continuously worn the contact to each new fastener will gradually worsen, whereby the wear of the fastener heads may be more severe. Also, the control of the tightening operation will be negatively affected and it may not be possible to control the torque by which the screw is fastened to a satisfactory degree.

Another problem related to vacuum adapters is that the front part of them needs to be individually adapted to a specific type of fastener. Typically, both the length and the diameter of the screw conduit are adapted to a specific type of fastener. For a fastener of another length or a differently sized fastener head the vacuum adapter needs to be replaced by a vacuum adapter with a screw conduit of another size. It is generally considered to be too cumbersome to exchange the vacuum adapter. Therefore, in general industrial applications different tools are used with different types of fasteners.

Hence, there is a need of a vacuum adapter that reduces the problems discussed above.

SUMMARY OF THE INVENTION

An object of the invention is to provide an improved vacuum adapter that handles the problems discussed above in a satisfactory manner.

This object is achieved by the invention according to claim 1, which relates to a vacuum adapter for a power tool with a bit holder extending from a front end of the power tool, which vacuum adapter is arranged to house said bit holder and to suck screws into alignment with a bit arranged inside said bit holder, and which vacuum adapter comprises:
 a connection part for connecting the vacuum adapter to said front end of said power tool, such that the vacuum adapter covers said bit holder of said tool,
 a vacuum connection for connecting the vacuum adapter to a negative pressure source. Further, the vacuum adapter comprises a quick coupling for rapid disconnection of at least a part of said vacuum adapter and for access to said bit holder.

The invention according to claim 1 solves the problem of wear of the screw heads and the bit by improving the accessibility of the bit and the bit holder, such that the bit may be replaced at regular intervals with little effort, and without the use of specific tools. The cost of the bits is negligible and is by far weighed up by the advantages in terms of a better control and shorter down time when a bit is changed.

Hence, by improving the accessibility of the bit holder it will be possible to exchange the bit at regular intervals and thereby reduce the wear of the screws and eliminate other problems relating to the wear of the bit and/or screws. It is to be noted that there may be other reasons to exchange the bit, for instance when the tool is to be used on another type of fastener, such that another type of bit is needed.

Also, the vacuum adapter, or at least a part thereof may be exchanged in order to match different types of fasteners. This is advantageous since it allows a tool to be easily and rapidly adapted to different types of fasteners.

In a specific embodiment the connection part for connecting the vacuum adapter to said front end of said power tool is a quick coupling.

In another embodiment the vacuum adapter comprises a cover part that is arranged to cover the bit holder and that is connected to the connection part via said quick coupling and that may be separately disconnected from the power tool, leaving the connection part attached to the power tool. In such an embodiment it is possible to have a number of different cover parts which are each adapted to a specific type of fastener and/or bit types, but which are all interconnectable to the same connection part via said quick coupling. The connection part may be an integral part of the power tool.

The power tool may also include a system of identifying the type of cover part that is attached to the power tool, e.g. by the use of a transponder (RFID) or the like. A control unit connected to or housed inside the power tool may be arranged to receive an indication of which type of cover part that is attached to the power tool and to produce an OK or NOK (Not OK) signal depending on that type of cover part is compatible with the current operation programmed in the power tool. Further, the bit may be provided with an ID, such that the type of cover part may be matched to the bit and to the current programmed operation. Namely, a specific the type of cover part is adapted to specific bit, and the control unit could be programmed to note if there is a match and yield an OK or NOK (Not OK) signal depending on the match.

The vacuum connection may be arranged on the connection part, such that the cover part may be disconnected from the power tool without affecting the vacuum connection. This is advantageous since often the hose that connects the vacuum adapter to the vacuum source is fixated to the tool. In order to avoid having to redo this fixation it may hence be advantageous to leave the part including the vacuum connection on the tool at all times.

The vacuum connection may also be integrated in the tool, wherein a connection port to a vacuum hose is arranged at one end of the tool and wherein a connection opening is provided at the connection between the power tool and the vacuum adapter.

In a specific embodiment the quick coupling includes a ball-recess connection. In another embodiment the quick coupling includes a bayonet coupling.

In another embodiment the vacuum connection is integrated in the connection between the power tool and the vacuum adapter. In such a case the vacuum source may be connected to the tool housing at any convenient location and a connection, e.g. a hose, inside the housing will connect the vacuum source to said integrated vacuum connection.

Other features and advantages of the invention will be apparent from the detailed description of the shown embodiments.

SHORT DESCRIPTION OF THE DRAWINGS

In the following detailed description reference is made to the accompanying drawings, of which:

FIG. 6 shows a power tool with a vacuum adapter according to a second embodiment of the invention;

FIG. 7 shows the vacuum adapter of the second embodiment in a released position;

FIG. 8 shows a perspective view of the vacuum adapter of the second embodiment of the invention;

FIG. 9 shows a sectional view of the vacuum adapter according to the second embodiment of the invention; and FIG. 10 shows a bit holder and a vacuum adapter according to the second embodiment of the invention in an exploded and sectional view.

DETAILED DESCRIPTION OF THE SHOWN EMBODIMENT OF THE INVENTION

Figure 1:
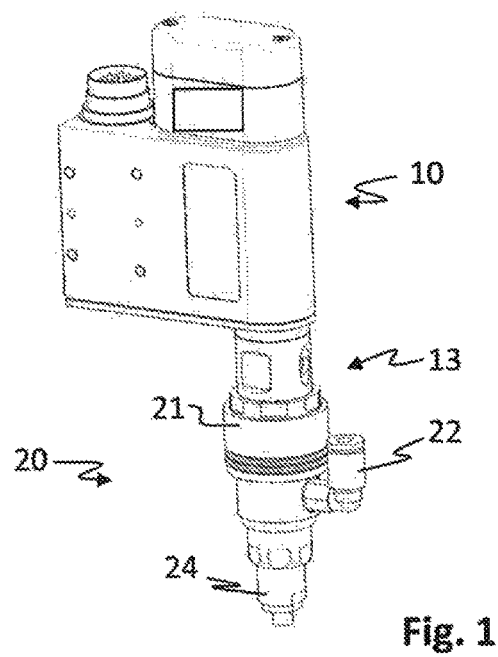
FIG. 1 shows a power tool with a vacuum adapter according to a first embodiment of the invention.
Figure 3:
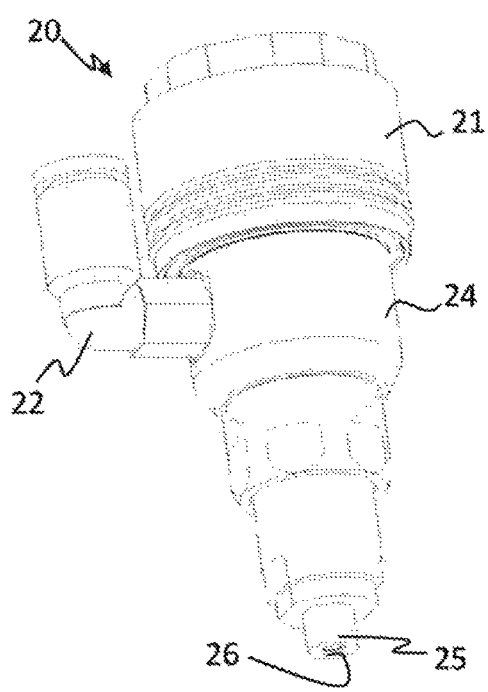
FIG. 3 shows a perspective view of a vacuum adapter of the first embodiment of the invention.

In FIG. 1 a power tool 10 is shown. A vacuum adapter 20 according to a first embodiment of the invention is arranged to a front end 13 of the power tool 10.

The vacuum adapter 20 comprises a connection part 21 for connecting the vacuum adapter 20 to the front end 13 of the power tool 10, such that the vacuum adapter 20 covers a bit holder 11 and a tool bit 12 of said tool 10. (See FIG. 2). A vacuum connection 22 for connecting the vacuum adapter 20 to a negative pressure source is arranged on said vacuum adapter. The negative pressure source and the hose connecting the vacuum connection 22 to the negative pressure source are not shown in the figures.

Figure 2:
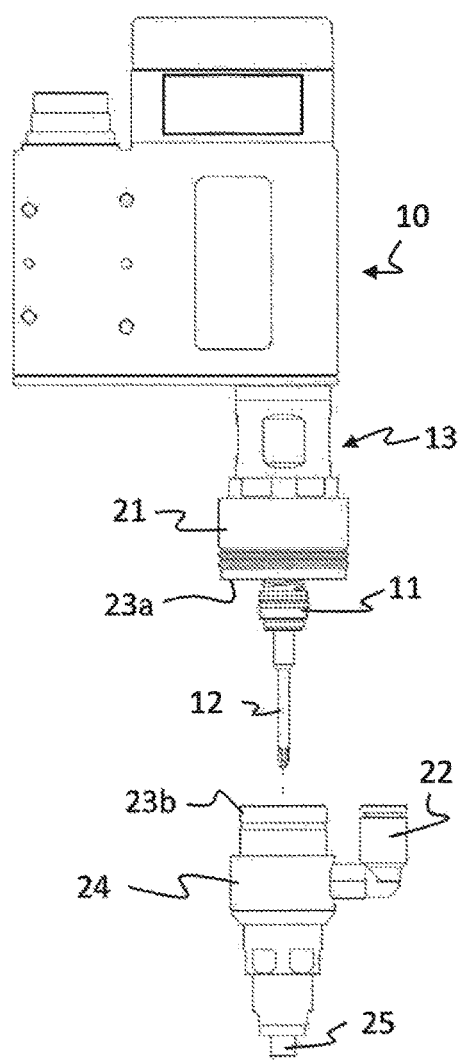
FIG. 2 shows the vacuum adapter of the first embodiment in a released position.

The vacuum adapter 20 comprises a quick coupling 23a,b for rapid disconnection of at least a part of said vacuum adapter 20 and for easy access to said bit holder 11. This is shown in FIG. 2. The vacuum adapter comprises two main parts, a connection part 21 for connecting the vacuum adapter 20 to the front end 13 of the power tool 10, and a cover part 24 that is arranged to cover the bit holder 11 and that is connected to the connection part 21 via the quick coupling 23a,b. The quick coupling includes a female part 23a and a male part 23b. In the shown embodiment the female part 23a is located on the connection part 21, and the male part 23b is located on the cover part 24. It may however just as well be the other way around.

Figures 4, 5:
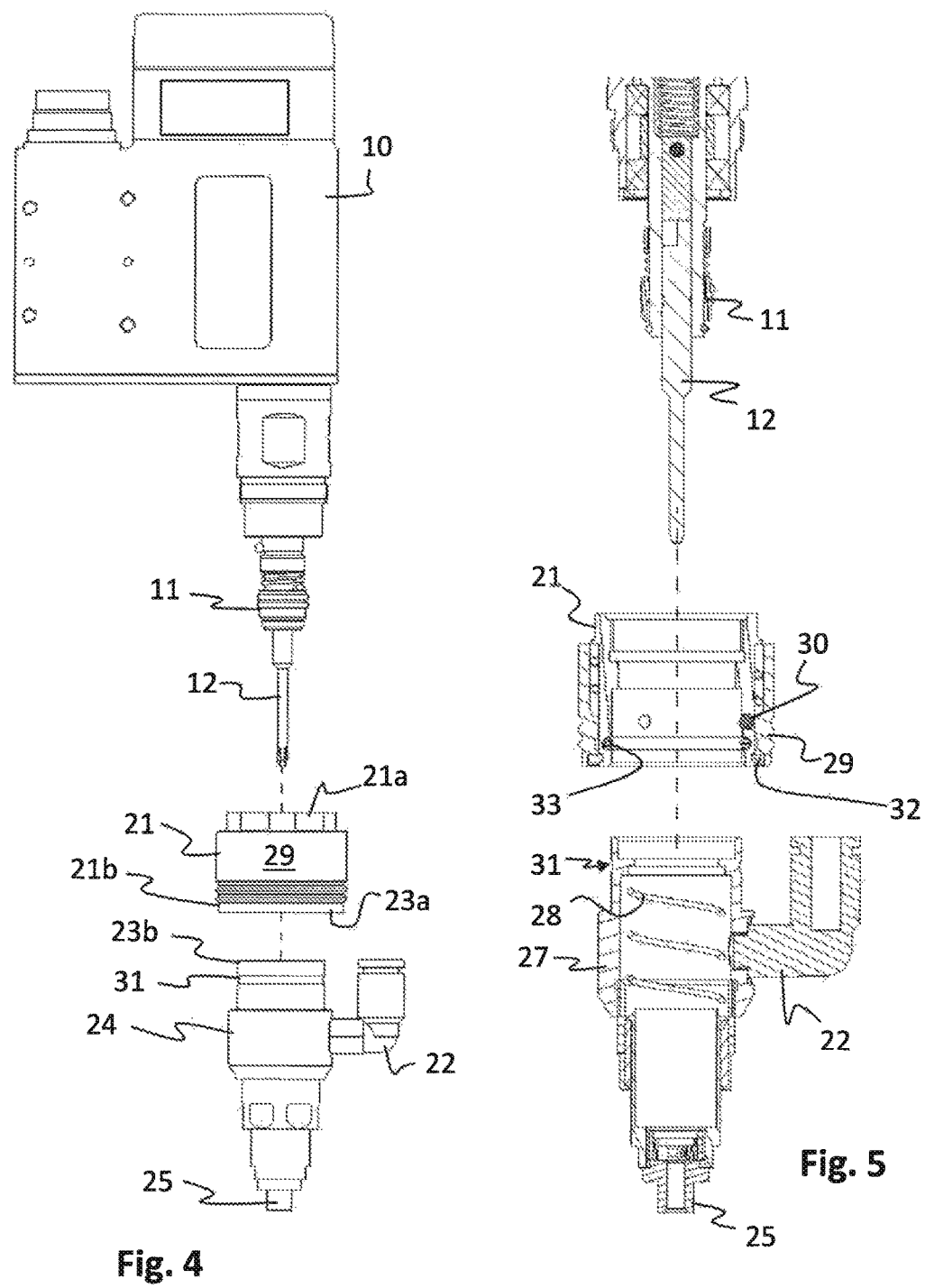
FIG. 4 shows a power tool and a vacuum adapter according to the first embodiment of the invention in an exploded view.
FIG. 5 shows a bit holder and a vacuum adapter according to the first embodiment of the invention in an exploded and sectional view.

Further, with reference to FIGS. 2, 4 and 5, the cover part 24 may be separated from the connection part 21 via said quick coupling 23a,b. In other words the cover part 24 may be separately disconnected from the power tool, leaving the connection part 21 attached to the power tool 10. Hence, in the shown embodiment, the connection part 21 includes a first end 21a that is adapted to be connected to the front end 13 of the power tool 10, and a second opposite end 21b that is adapted to be connected to the cover part 24 via said quick coupling 23a,b. The connection part 21 may be connectable to the power tool 10 by means of a threaded engagement. In particular, the connection part 21 may be adapted to the connection means on existing power tools that are adapted to be used with a vacuum adapter. With such an arrangement the vacuum adapter may be ready to use with any existing power tool on the market. In another embodiment the connection means may be an integral part of the vacuum adapter, wherein the connection to the power tool is of a quick coupling type. This of course implies that the power tool needs to be furnished with a quick coupling part that may be connected to a corresponding quick coupling part on the integrated connection part of the vacuum adapter.

The vacuum adapter 20 is arranged to suck screws into alignment with the bit 12 arranged inside the bit holder 11. The cover part 24 includes a tubular portion 25 with a bore 26 of a diameter that corresponds to the size of the screw head of a screw that is to be screwed by means of the power tool 10. A negative pressure is created by a vacuum source via the vacuum connection 22, whereby air will be sucked in through the bore 26 of the tubular portion 25.

In use, the power tool will be manoeuvred such that the outer end of the tubular portion 25 will be located next to the screw head of the screw to be fastened. The power tool 10 may be either manually operated or automatically controlled by e.g. a robot. Due to the negative pressure inside the vacuum adapter the screw will be sucked into the tubular part 25. The bit 12 will be arranged such that its tip reaches into or close to the tubular part 25, whereby the screw will be sucked into contact with the bit 12. The diameter of the bore 26 of the tubular part 25 will be adapted such that a sucking force acting on the screw will be enough to get the screw into contact with the bit 12. Hence, the diameter of the bore 26 will be just a fraction larger than the diameter of the screw head of the screw to be sucked up.

As is visible in FIG. 5 the tubular part 25 of the cover part 24 is movably attached with respect to a main portion 27 of the cover part 24. Specifically, the tubular part 25 is telescopically attached to the main portion 27 of the cover part 24. A spring 28 is arranged inside the main portion 27 of the cover part 24. The spring 28 is arranged to act on the tubular portion 25 in order to keep it in its most extended position with respect to the main portion 27.

The length of the tubular part 25 is adapted to the length of the screw. Hence, when the screw is in its initial position inside the cover part 24 and the tubular part is fully extended only the tip of the screw will extend outside the opening of the tubular part 25. In this way the operator will be able to position the tip of the screw in the screw hole into which it is to be screwed. As the screwing operation proceeds and the screw reaches farther into the screw hole the tubular portion 25 will be pressed into the main part 27 of the cover part 24 to a corresponding degree and against the action of the spring 28. Hence, in order to allow the screw to be fully screwed into the screw hole the tubular part 25 is arranged such that it may be translated into the cover part 24 to such an extent that the bit 12 may reach out of its opening. Thereby, the bit 12 will be allowed to come into contact with the screw hole such that the screw may be fully fastened.

The cover part may be exchanged for a cover part with a similar quick coupling part 31b but with a tubular part 25 adapted to another type of fastener. In other words both the diameter and the length of the bore 26 may be different, on different cover parts. The quick coupling 23a,b, which is best shown in FIG. 5, is of the type that includes a ball-recess coupling. In the shown embodiment the connection part 21 includes a sleeve 29 that is to be pulled away from the cover part 24 in order to release the cover part 24, which may then be pulled out of its connection to the connection part 21. The translational movement of the sleeve 29 allows for the balls 30 to pass into a circumferential recess 32 in the interior of the sleeve 29. Thereby, the balls 30 may slip out of the circumferential recess 31 on the male part 23b of the quick coupling such that the male part 23b may be pulled out from the female part 23a.

An O-ring 33 is arranged along a circumferential recess on the inside of the female part 23a. The O-ring keeps the connection between the male and female parts fluid tight.

The quick coupling may be of different types, and does not need to include a ball-recess coupling. For instance it may comprise a bayonet coupling, including e.g. threaded portions angularly spaced from each other on both the female part and the male part, such that the female part may be slided onto the male part without interaction of the threaded portions and such that mutual rotation will lock the male and female parts to each other by interaction of the threaded portions. The bayonet coupling may also comprise a pin-track interaction or any other kind of cam profile-cam follower interaction.

A second embodiment of the inventive vacuum adapter 40 is shown in FIGS. 6-10.

The vacuum adapter 40 of this second embodiment comprises a connection part 41 for connecting the vacuum adapter 40 to the front end 13 of the power tool 10. A cover part 44 of the vacuum adapter 40 covers the bit holder 11 of the tool 10. The vacuum connection 42 for connecting the vacuum adapter 40 to a negative pressure source is arranged on said connection part 41, such that the cover part 44 may be disconnected from the power tool 10 without affecting the vacuum connection 42. In FIG. 6 the vacuum adapter 40 is shown in position on the power tool 10 and in FIG. 8 it is shown on its own in non-attached mode. As indicated in FIG. 8 the cover part 44 of the vacuum adapter 40 includes a tubular part 45 and a main part 47.

As is apparent from FIG. 7 a quick coupling 43a,b is arranged for rapid disconnection of the cover part 44 from the connection part 41. The quick coupling includes a female part 43a located on the connection part 41 and a male part 43b located on the cover part 44. The connection part 41 includes a first end 41a that is adapted to be connected to the front end 13 of the power tool 10, and a second opposite end 41b that is adapted to be connected to the cover part 44 via said quick coupling 43a,b. When the cover part 44 is released from the connection part 41 the bit holder 11 is accessible such that the tool bit 12 may be easily released and replaced.

As is visible in FIGS. 9 and 10, the quick coupling 43a,b of the second embodiment differs from the quick coupling of the first embodiment. The main difference is that there is no translatable sleeve in the second embodiment. There is however a ball-recess interaction. Balls 50 are fitted inside the female part 43a and are arranged to interact with a circumferential recess 51 in the male part of the quick coupling 43a,b. The balls are pressed into the recess by means of a spring 52. The spring action of the spring 52 is such adapted that it may be relatively easy to overcome in order to allow the cover part to be pulled out from the connection part. Further, in use the negative pressure inside the vacuum adapter will act so as to make it difficult to release the quick coupling 23a,b. Similar to the first embodiment described above the quick coupling may be of any type and is e.g. not restricted to a ball-recess interaction.

The tubular part 45 of the cover part 44 is telescopically attached with respect to the main portion 47 of the cover part 44. A spring 48 is arranged inside the main portion 47 of the cover part 44. The spring 48 is arranged to act on the tubular portion 45 in order to keep it in its most extended position. The function of the tubular part 45 is similar to that of the tubular part 25 of the first embodiment. An O-ring 53 is arranged in the inside of the female part 43a, in order to keep the connection between the male and female parts fluid tight.

Above, the invention has been described with reference to two specific embodiments. The invention is however not limited to these embodiments. It is obvious to a person skilled in the art that the invention comprises further embodiments within its scope of protection, which is defined by the following claims.

The invention claimed is:

1. A vacuum adapter for a power tool, wherein the power tool has a bit holder extending from a front end of the power tool, and the vacuum adapter is configured to house the bit holder and to suck screws into alignment with a bit arranged inside the bit holder, the vacuum adapter comprising:
   a connection part for connecting the vacuum adapter to the front end of the power tool such that the vacuum adapter covers the bit holder;
   a vacuum connection for connecting the vacuum adapter to a negative pressure source;
   a quick coupling for rapid disconnection of at least a part of the vacuum adapter in order to provide access to the bit holder for exchanging bits; and
   a cover part that is arranged to cover the bit holder, is connected to the connection part via the quick coupling, and is configured to be separately disconnected from the power tool, leaving the connection part attached to the power tool;
   wherein the vacuum connection is arranged on the connection part such that the cover part is disconnectable from the power tool without affecting the vacuum connection; and
   wherein the vacuum adapter comprises a plurality of cover parts which are different from each other and are adapted to different types of fasteners and/or bit types.

2. The vacuum adapter according to claim 1, wherein the quick coupling includes a ball-recess connection.

3. The vacuum adapter according to claim 1, wherein the quick coupling includes a bayonet coupling.

\* \* \* \* \*